United States Patent Office 3,308,211
Patented Mar. 7, 1967

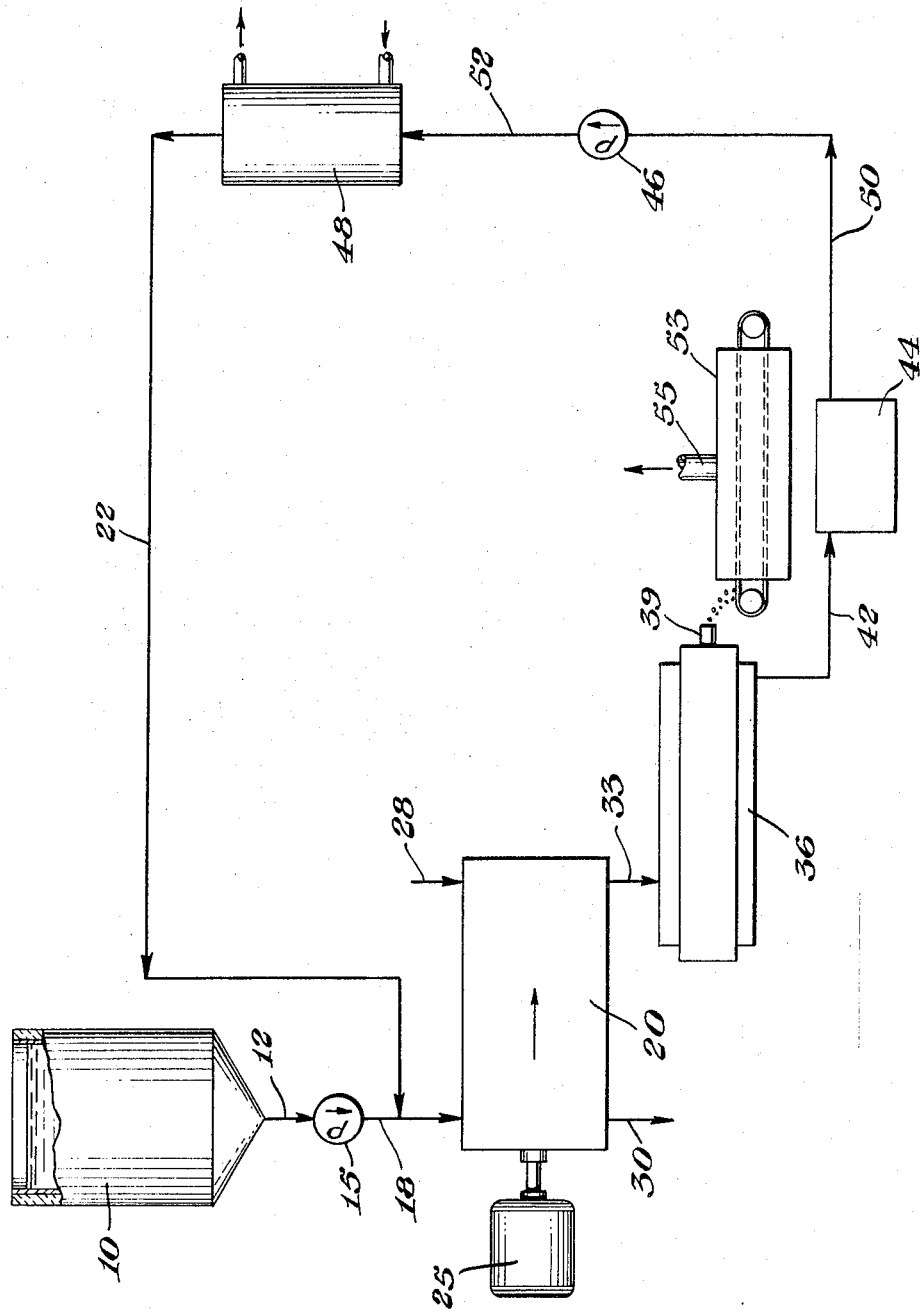

3,308,211
PROCESS FOR PRODUCING PLASTIC GRANULES
Le Forrest C. Plastridge, Saginaw, Mich., assignor to Baker Perkins Inc., Saginaw, Mich., a corporation of New York
Filed June 27, 1962, Ser. No. 205,645
10 Claims. (Cl. 264—5)

This invention relates to a process for producing granules of thermoplastic materials from molten plastic and is particularly concerned with the production of synthetic, organic, thermoplastic resin particulates such as polyolefins and the virtual elimination of any solvent therefrom.

Thermoplastic resin materials are generally supplied to the fabricator of the finished consumer product as powder, granule, or bead material which may be suitably melted or softened and given its final shape by molding, extruding and the like. In order to supply the thermoplastic resin in such form, the resin manufacturer, who synthesizes the resin, or the compounder who blends the resin with the plasticizers, pigments, and other agents necessary for the final fabrication, is presented with a number of problems. Frequently the granule supplier will have to perform a number of operations upon the molten resin to convert it to granular form. Usually the resin will be molded or extruded to a convenient shape and then, after hardening at least to some extent, the shaped object is broken or cut into particles of suitable size. The size range of such particles is, of course, limited and the cutting or shredding of thermoplastic resin materials, which frequently are inclined to be sticky, is often difficult to achieve with uniform results.

The process of this invention enables thermoplastic resin materials to be converted directly from the molten form to a homogeneous, granular form of such reduced size that solvent incorporated with the plastic in amounts of 70–90 percent by volume can be readily eliminated in a second step with heat or heat and moisture without solidification of the plastic into a macro-shape. In the process of this invention, molten thermoplastic resin material and a dispersant liquid are fed at about the same temperature to a homogenizer where a liquid-liquid emulsion of molten resin and dispersant liquid is formed by agitation. The emulsion is cooled below the solidification temperature of the resin while still subject to the influence of the agitators to form a solid-in-liquid suspension of resin in dispersant and the solid and liquid phases are separated. The resin-dispersant mixture passes through the homogenizer while being simultaneously beaten and cooled to a temperature below the melting point of the resin and preferably below the softening point of the resin but above the freezing point of the liquid dispersant. The chilled mixture may then be subjected to a simple screening operation to recover the resin granules and the granules may be treated to remove solvent therefrom.

The invention will be better understood by reference to the accompanying drawing, which is a diagrammatic representation of the process of this invention but should not be considered limiting.

In the process the insulated hopper 10, a jacketed tank or polymer reactor is provided with or forms molten thermoplastic resin. This resin, in the liquid state, is drawn from the hopper through the line 12 by pump 15 and sent through line 18 to the homogenizer 20. Dispersant liquid, e.g. water, having about the same or a slightly lower temperature than the resin is sent to homogenizer 20 from line 22. The mixture of resin and dispersant moves from left to right, as shown by the arrow in the drawing, under the influence of beaters in the homogenizer which are driven by variable speed motor 25. The homogenizer is also preferably provided with lines for a coolant fluid which preferably enters the homogenizer by line 28, passes in an indirect heat-exchange relationship with the mixture of resin and dispersant and exits by line 30. The heat exchange relationship is preferably countercurrent and the liquid fed at 28 is at a temperature below the melting point of the resin, preferably below the softening temperature of the resin, but generally is above the freezing temperature of the dispersant. As is apparent, as the liquid resin-dispersant mixture passes through the homogenizer it is subjected to the action of beaters which break up the molten, and later solidifying resin particles in the mixture. The chilled mixture leaves the homogenizer 20 by the line 33 which goes, preferably, to a vibrating or rotating screen apparatus such as 36. The screen separates the solidified granular synthetic resin which is removed by line 39, from the liquid dispersant which goes by line 42 to reservoir 44. Some solvent usually will be included with the dispersant and can be recovered in various ways such as utilizing a settling tank and permitting it to settle out so that it can be removed. The apparatus which may be employed in this invention preferably also contains means, such as the pump 46, and heat exchanger 48, along with associated lines 50 and 52, for return of heated dispersant to the line 22. Line 39 leads to a steam distillation apparatus 53 in which conveyor 54 transports the particles through a steam heat atmosphere maintained at a temperature sufficient to drive off the solvent to a recovery stack 55. The granules must be small for the steam distillation to do an efficient job of removal.

As mentioned, the process of this invention is applicable to the preparation of granular thermoplastic materials such as poly-lower olefins, e.g., polyethylene and polypropylene. These materials may be sent to the process of this invention directly from the synthesis zone or may be prepared for their granulation treatment by being heated to a molten state, that is, a state where the resin is flowable, at least under the influence of a pump, and takes the shape of its container. The temperature, of course, should be below the decomposition temperature of the resin. A suitable temperature range when processing, for example, polyethylene, is about 225° F. to 350° F., advantageously about 250° F.

The dispersant used in the process of this invention is chosen with a view to the final particulate size desired in the resin granule product and the finer the grain desired the more compatible with the resin will be the dispersant chosen in order to give a finer dispersion. Generally water is the preferred dispersant from an economic standpoint and the use of such a dispersant generally produces granules of a size which is easily screened and which is acceptable to the thermo-plastic resin fabricator.

The boiling and freezing points of the dispersant also influence the choice. As mentioned, the dispersant is mixed with the molten resin preferably at about the same or a slightly lower temperature. The dispersant is chosen, therefore, from among materials which are liquid at this temperature. Although elevated pressures may sometimes be required to maintain this liquid state, the dispersant should not require the use of overly costly pressurizing equipment. Also, of course, the freezing point of the dispersant should not be higher than the solidification point of the resin, which in the case of polyethylene is about 150°–300° F.

The size of the resin granules produced in the process of this invention is influenced also by the amount of, and temperature of, dispersant employed and the degree of agitation in the homogenizer. As pointed out, this latter operation is controllable by varying the speed of the homogenizer drive.

Generally the dispersant is used in quantities sufficient to insure that it will be the continuous phase of the emulsion formed in the homogenizer and will ordinarily be greater than 60% by volume of the mixture fed to the homogenizer. In the case of water and polyolefin, the dispersant will generally comprise about 60% to 90% of the mixture which, when the agitators are moved at a proper speed, provides the small particles or granules necessary to separation of the solvent. The water is supplied at a temperature of 180°F.–200°F.

The homogenizer device employed in this invention may be one of a number of commercially available agitation apparatuses. The device described in U.S. Patent No. 2,538,466 has been found especially useful in the performance of this invention on a continuous basis. The patented device provides a series of homogenization chambers in series and provides also for passages in an indirect heat exchange relationship with the homogenization chambers. These passages may be used in series, providing for counter-current flow of cooling fluid, as suggested in the drawing, from the homogenization chamber adjacent the resin-mixture outlet to the homogenization chamber adjacent the resin-dispersant inlet or separate resin and dispersant inlets. It also may sometimes be desirable in the practice of this invention to confine the heat exchange with cooling fluid to the chamber or chambers adjacent the resin-dispersant mixture outlet while flowing a warming liquid in indirect heat exchange relation with the chamber near the resin inlet in order to provide for more complete dispersion of the resin before solidification begins. Electric heating elements also may be used near the resin entrance to insure or prolong the molten condition.

After the removal of the dispersant from the resin granules, preferably by the screening mechanism described, the granules may be steam treated as noted at below the melting point of the resin to remove the solvent and any volatile impurities. This step shrinks the particles in size to about one-seventh to one-tenth their former size in view of the removal of the solvent, which constitutes about 70–90 percent of the volume of the resin particles. The final product is a free flowing powder.

*Example*

The following example of the process of this invention is illustrative and should not be considered limiting.

A batch of polyethylene resin having a solvent (methyl ethyl ketone) content of 90 percent by volume was formed in a reactor. The molten resin mixture was then held in an insulated tank at a temperature of about 250°F. while gradually being pumped into a homogenizer of the type described along with about three times its volume of water. The water was at a temperature of about 200°F. and a pressure sufficient to maintain its liquid state. The mixture of resin and water was fed to a homogenizer of the type described having 10 chambers of about 9⅞ inches diameter, each chamber having a four-vane beater of about 8⅞ inches diameter which is operated at about 580 r.p.m. Cooling water was passed in counter-current heat exchange relationship with the resin water mixture. This coolant entered the homogenizer near the exit end at a temperature of about 140°F. and left the homogenizer at a temperature of about 160°F. The resin particle-water mixture left the homogenizer at about 150°F. to 180°F. and was sent to the inside of a vibrating screen which conveyed the particles longitudinally to the steam distillation apparatus. The resin product leaving the screen was in the form of uneven particles about 3/16″ x 1/16″ or 1/8″ and after distillation was in the form of free-flowing powder of about one-tenth the size.

Other commercially employed solvents for polyethylene at elevated temperatures (above 150°F.) which may be present and are removable are toluene, benzene, and chlorobenzene. For both polyethylene and polypropylene, hexane and heptane are sometimes employed as solvents at elevated temperatures and would be removable in the steam distillation apparatus or in other suitable apparatus.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

I claim:
1. A process for the production of granular synthetic resin which comprises: forming an emulsion of molten, synthetic, thermoplastic resin by mixing the same at a temperature above the melting point of the resin with a liquid dispersant with agitation to produce a liquid-liquid emulsion; cooling said emulsion of resin and dispersant by indirect countercurrent heat exchange while mixing the resin and dispersant and without mixing coolant with the emulsion, the cooling while agitating solidifying the resin in particles of predetermined size and retaining the dispersant in liquid form to produce a resin-in-dispersant suspension; and separating solidified resin particles from said resin-in-dispersant suspension.

2. The process of claim 1 in which the emulsion contains greater than 60% of the dispersant by volume.

3. The process of claim 1 in which the emulsion is formed by passage of a mixture of the molten resin and dispersant through a series of mechanical agitation stages.

4. The process of claim 1 in which the cooling is performed by countercurrent indirect heat exchange with a cooling fluid.

5. A process for the production of granular synthetic polyolefin resin powder which comprises: providing a solution of synthetic thermoplastic polyolefin resin containing a solvent at a temperature above the melting point of the resin; mixing this solution with a liquid dispersant which will not react with the resin or solvent and agitating the mixture in successive homogenizing chambers to provide a liquid-liquid emulsion, said dispersant being added in an amount sufficient to insure that the dispersant is the continuous phase and the resin solution the dispersed phase; cooling the emulsion by counter current, indirect heat exchange while agitating the same to solidify the resin solution and retaining the dispersant in liquid form to produce a resin-in-dispersant suspension; separating solidified resin particles from the suspension; recirculating the dispersant to mix with additional resin; and separating solvent from the particles to shrink said particles.

6. The process of claim 5 in which the solvent content of the resin is about 70–90% by volume.

7. The process of claim 5 in which the solvent is separated from the granules by steam treatment.

8. The process of claim 5 in which the solvent is separated from the particles by heat treatment.

9. The process of claim 5 in which the polyolefin is polyethylene which is at a temperature of about 225 to 350° F. at the time it is mixed with the dispersant, the dispersant is water and comprises about 60 to 90% of the mixture.

10. The process of claim 5 in which the water is supplied at a temperature of about 180 to 200° F. and the solvent is selected from the group consisting of methyl ethyl ketone, toluene, benzene, chlorobenzene, hexane and heptane.

References Cited by the Examiner

UNITED STATES PATENTS

| | | | |
|---|---|---|---|
| 1,976,433 | 10/1934 | Cheetham | 260—96 |
| 2,027,114 | 1/1936 | Olsen et al. | |
| 2,064,487 | 12/1936 | Miller | 260—96 |
| 2,069,178 | 1/1937 | Dent et al. | 260—96 |
| 2,120,343 | 6/1938 | Wolf | 260—96 |

(Other references on following page)

UNITED STATES PATENTS

| | | | |
|---|---|---|---|
| 2,190,922 | 2/1940 | Heath et al. | 264—9 X |
| 2,280,703 | 4/1942 | Hart | 264—9 |
| 2,282,037 | 5/1942 | Dahle | 264—96 |
| 2,356,896 | 8/1944 | Smith | 260—96 |
| 2,451,743 | 10/1948 | Jarrett | 260—96 |
| 2,467,055 | 4/1949 | Sans et al. | 260—96 |
| 2,691,800 | 10/1954 | Seavey | 264—9 X |
| 2,862,895 | 12/1958 | Cummings et al. | 260—96 |
| 2,917,345 | 12/1959 | Phillips et al. | |
| 2,945,020 | 7/1960 | Hall | 260—96 |
| 2,968,066 | 1/1961 | Ballast et al. | 264—9 |
| 2,977,351 | 3/1961 | Wiley. | |
| 3,070,835 | 1/1963 | Alsys | 264—142 X |

FOREIGN PATENTS

| | | |
|---|---|---|
| 564,778 | 10/1958 | Canada. |

ALEXANDER H. BRODMERKEL, *Primary Examiner.*

MICHAEL V. BRINDISI, *Examiner.*

L. D. RUTLEDGE, A. L. LEAVITT, B. SNYDER,
*Assistant Examiners.*